United States Patent
Iakovenko et al.

(10) Patent No.: US 9,747,521 B2
(45) Date of Patent: Aug. 29, 2017

(54) FREQUENCY DOMAIN INTEREST POINT DESCRIPTOR

(71) Applicant: VideoGorillas LLC, Walnut, CA (US)

(72) Inventors: Andrii Iakovenko, Kiev (UA); Oleksandr Zhukov, Kiev (UA)

(73) Assignee: VideoGorillas LLC, Walnut, CA (US)

( * ) Notice: Subject to any disclaimer, the term of this patent is extended or adjusted under 35 U.S.C. 154(b) by 201 days.

(21) Appl. No.: 13/867,467

(22) Filed: Apr. 22, 2013

(65) Prior Publication Data

US 2013/0243341 A1    Sep. 19, 2013

Related U.S. Application Data

(60) Provisional application No. 61/712,304, filed on Oct. 11, 2012.

(51) Int. Cl.
*G06K 9/68*      (2006.01)
*G06K 9/62*      (2006.01)
*G06K 9/46*      (2006.01)

(52) U.S. Cl.
CPC ......... *G06K 9/6202* (2013.01); *G06K 9/4671* (2013.01)

(58) Field of Classification Search
CPC ...... G06K 9/6202; G06K 9/6203; G06K 9/00; G06K 9/2054; G06T 7/001; G06T 5/001; G06T 2207/10016; G06T 7/0081
USPC ................ 382/218, 195, 181, 190, 260, 261
See application file for complete search history.

(56) References Cited

PUBLICATIONS

Lin et al: "An Integrated Technique for Splicing and Copy-move Forgery Image Detection", IEEE, 2011.*
Bai et al: "Analysis of Histogram Descriptor for Image Retrieval in DCT Domain", SVBH, 2011.*

\* cited by examiner

*Primary Examiner* — Ruiping Li
(74) *Attorney, Agent, or Firm* — Schwegman Lundberg & Woessner, P.A.; Ariel Reinitz

(57) ABSTRACT

Systems and methods for image analysis and recognition are disclosed, in particular the methods for interest point description. An interest point and its surrounding area is broken into subareas, a frequency domain description of each area is created by applying discrete Fourier transform (DFT). Frequency domain features are than coded bitwise by comparing them to predefined thresholds. Subsequently, the present invention provides alternative or improved methods and data structures for interest point description that may reduce memory consumption and allow fast bitwise matching.

20 Claims, 7 Drawing Sheets

Example of matched pairs of features

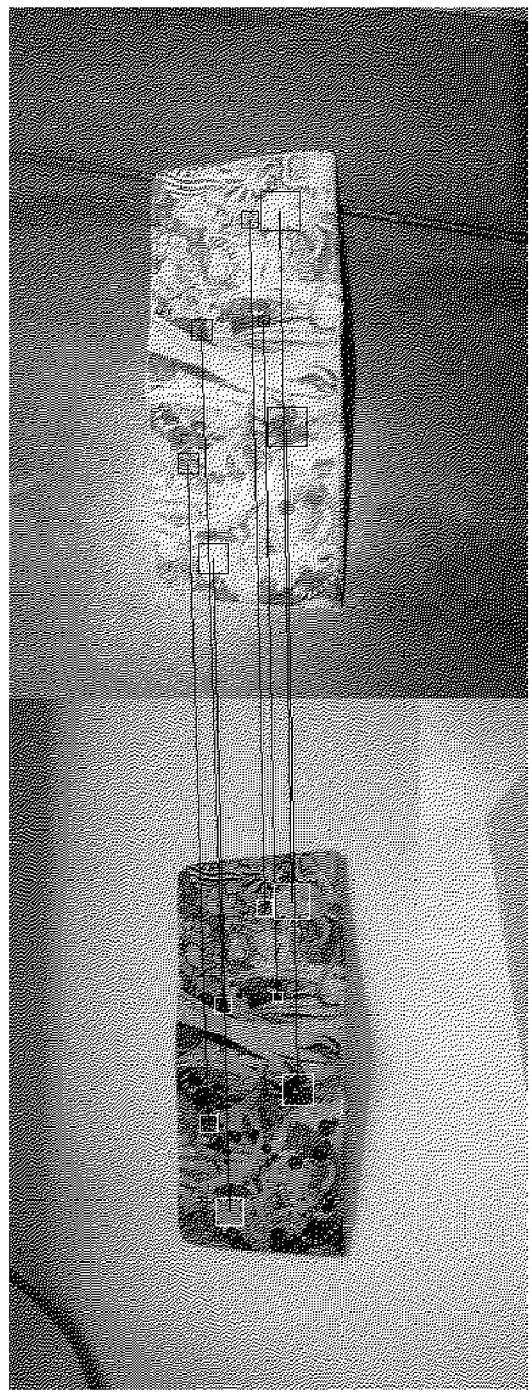
FIG. 1 Example of matched pairs of features

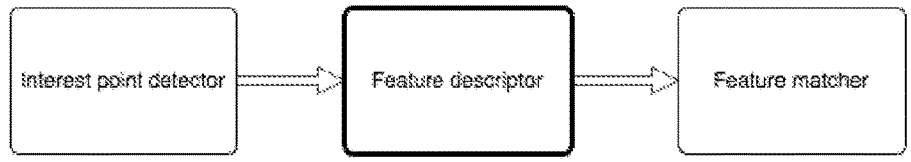
FIG. 2 General approach to image recognition
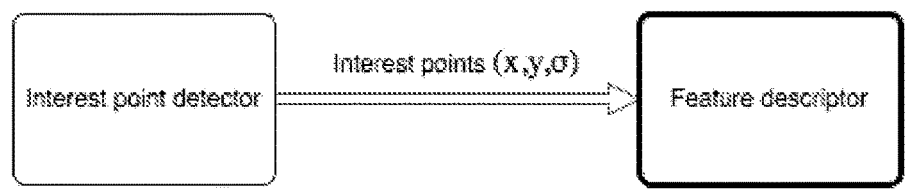
FIG. 3 Interaction between interest point detector and descriptor
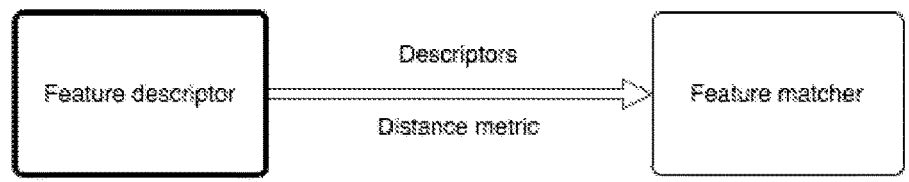
FIG. 4 Interaction between interest point descriptor and feature matcher
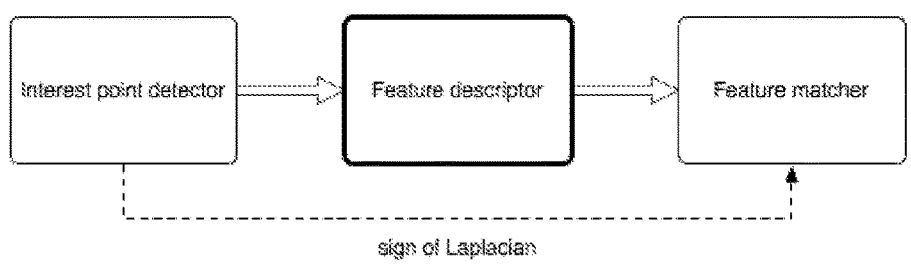
FIG. 5 Optional usage of sign of Laplacian in matcher

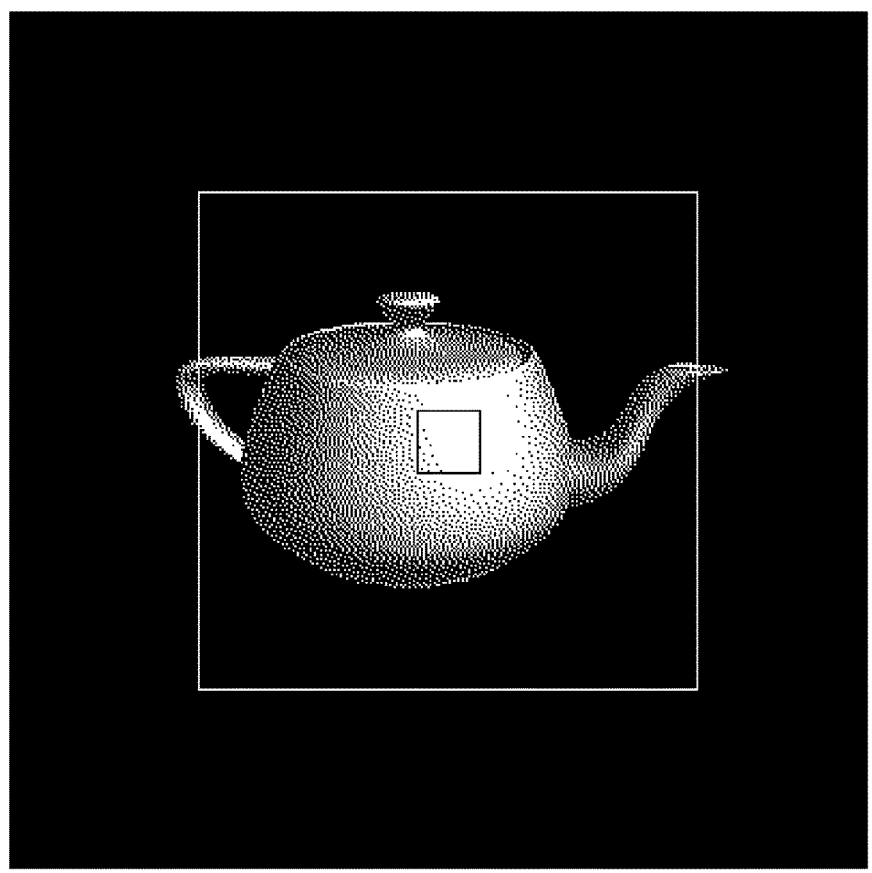
FIG. 6: Areas of size σ and 8σ around the interest point corresponding to the whole pot

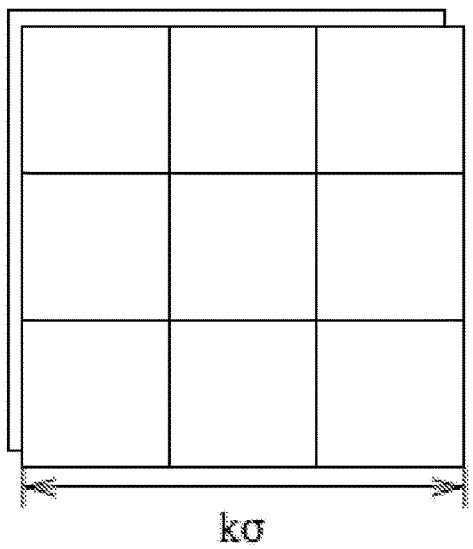
FIG. 7 Breakdown of the interest point and its surroundings into subareas
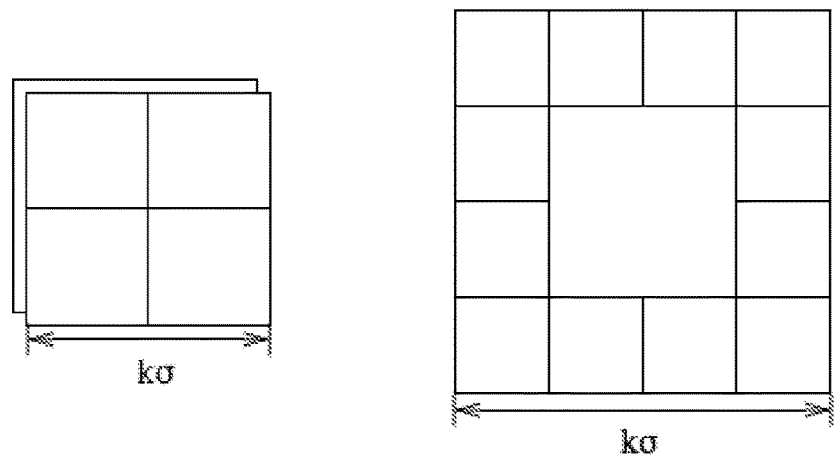
FIG. 8: Alternative approaches to breakdown of the interest point and its surroundings into subareas

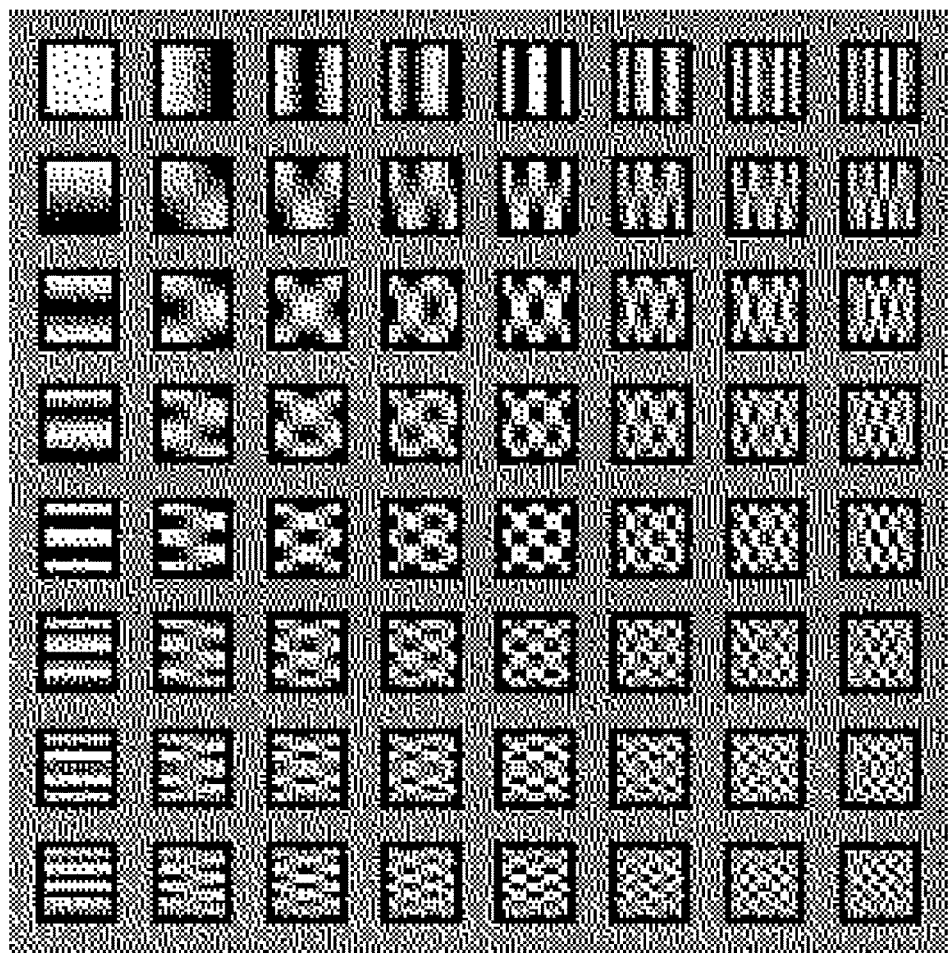
FIG. 9 Spatial domain representation of frequency domain features $F_{ij}$

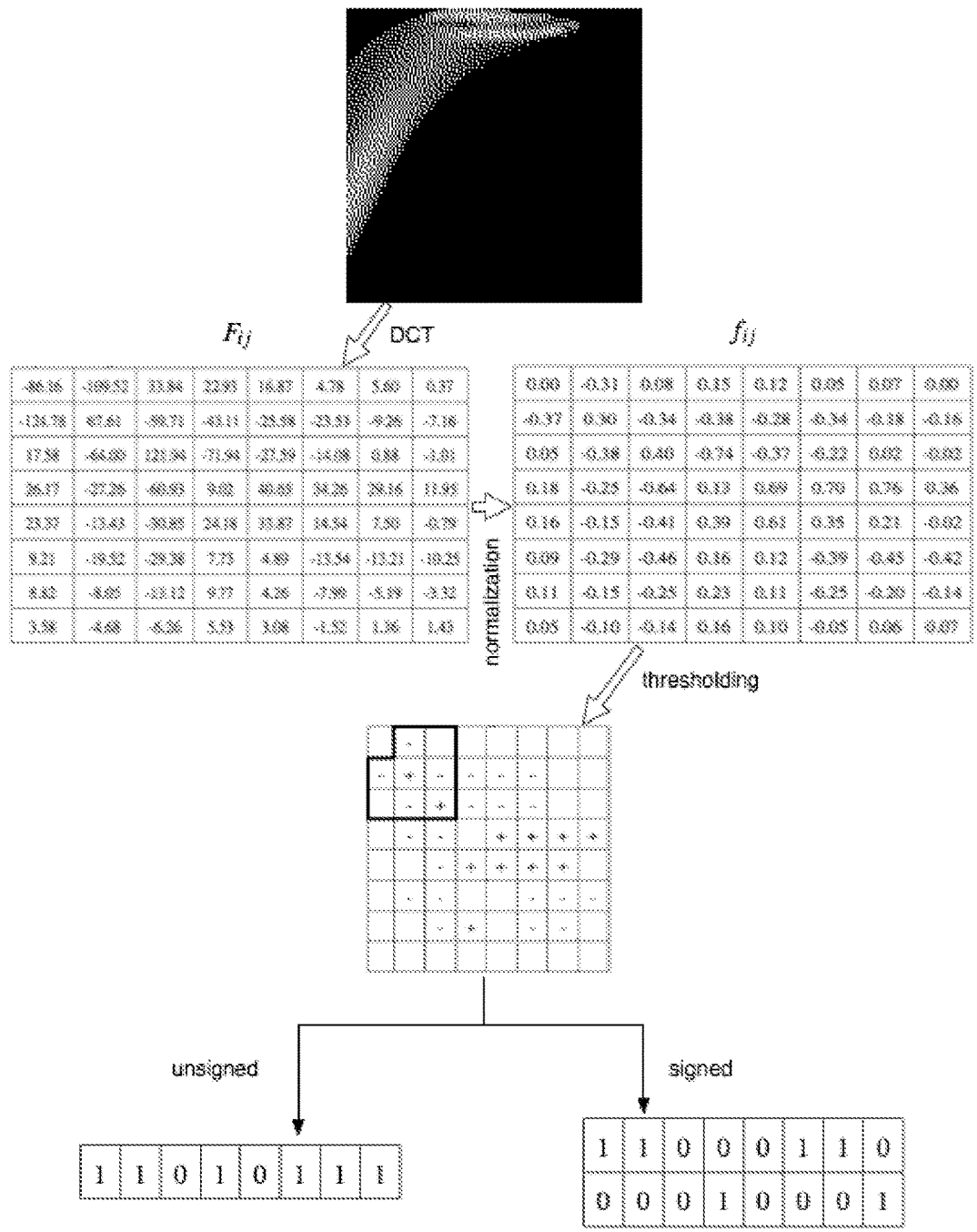
FIG. 10 Interest point subarea descriptor creation process

| A | 0 | 0 | 0 | 0 | 1 | 1 | 1 | 1 |
|---|---|---|---|---|---|---|---|---|
| B | 0 | 0 | 1 | 1 | 1 | 1 | 0 | 1 |
| A xor B | 0 | 0 | 1 | 1 | 0 | 0 | 1 | 0 |

$$dist(A, B) = 3$$

FIG. 11 Hamming distance

FREQUENCY DOMAIN INTEREST POINT DESCRIPTOR

CROSS-REFERENCE TO RELATED APPLICATIONS

This application claims the benefit of provisional patent application No. 61/712,304, filed 2012 Oct. 11 by the present inventor.

FIELD OF THE INVENTION

The present invention relates to methods and apparatus for operating on images, in particular methods and apparatus for description and matching of interest points either in the same or in a different image. The present invention also relates to measuring the similarity score for pairs of image features.

BACKGROUND OF THE INVENTION

Modern computer vision applications are widely used for a range of practical purposes including image registration, object recognition and 3D reconstruction to name a few. Derivation of mathematically processable representation of an image is a prerequisite of any such application or algorithm. In most existing models such representation is created using the following stages:
1. Interest point detection, i.e. detection of image features robust to noise, detection errors and geometric and photometric deformations.
2. Feature description, i.e. creation of distinctive mathematical description providing the means to numerically measure their similarity.
3. Matching of pairs of feature descriptors based on their similarity scores, e.g. Euclidean distances between descriptor vectors.

See FIG. 3.

Historically, most interest point detectors are based on first and second spatial derivatives. Most notable representatives are Harris corner detector [Harris C., 1988] using second-moment matrix and its scale invariant modifications, such Laplacian of Gaussian, SIFT's difference of Gaussians [Lowe, 2004] and Fast-Hessian detector used in SURF [Herbert Bay, 2008]. Among these, SURF's Fast-Hessian detector shows the best performance while producing output robust to distortions and lighting changes. Out of non-Harris-based detectors, FAST [Rosten and Drummond, 2006] is worth mentioning. FAST outperforms SURF, but is not scale-invariant. As a result of interest point detection, pair of coordinates and scale $(x,y,\sigma)$ are produced and passed as an input to feature descriptor.

Most notable feature descriptor implementations are SIFT and SURF [Lowe, 2000, Funayama, 2012], that are considered industry standard for modern applications. However, the size of these descriptors varies from 144 to 512 bytes which imposes serious memory consumption limitations on large scale applications. Theoretically, a 144-byte (1152-bit) descriptor may distinguish between $2^{1152}$ different objects. This is far more than required in any practical application. Furthermore, SIFT and SURF descriptors are based on vectors of floating point numbers, therefore distance computation requires a lot of time-consuming floating point operations.

Accordingly, what is desired, and not heretofore been developed, is a feature descriptor that uses only bitwise and integer operations for distance computation and has a significantly smaller memory footprint. Developing such a descriptor would considerably speed up the matching step for large image databases.

BRIEF SUMMARY OF THE INVENTION

It is an object of the present invention to provide a distinct and compact interest point descriptor. The descriptor is created by dividing an interest point and its surroundings into subareas, the actual method of division being a trade-off between performance and distinctiveness. Afterwards, each of the subareas is described independently.

First, a frequency domain representation is created by applying DFT. Then, after optional normalization step providing contrast invariance, frequencies to encode are selected and the value at each of them is compared to a predefined threshold assigned to that frequency. Subsequently, a bitwise description of the frequency domain is created as a result of this comparison. See FIG. 10.

Obtained subarea descriptor bit strings are appended into a single descriptor of the whole area. The distance between the descriptors is defined as the Hamming distance in the matching stage. This allows to perform matching substantially faster than with previous descriptors.

BRIEF DESCRIPTION OF THE DRAWINGS

FIG. 2 is an example of pairs of features matched between two images.

FIG. 3 illustrates general approach to image recognition. The stage where the present invention is used is highlighted.

FIG. 4 describes the interaction between interest point detector and descriptor.

FIG. 5 describes the interaction between interest point descriptor and feature matcher.

FIG. 6 shows optional data provided to feature matcher by interest point detector.

FIG. 1 marks variously sized areas around an interest point.

FIG. 7 illustrates the division of the described area into smaller subareas.

FIG. 8 provides some examples of alternative subarea division.

FIG. 9 shows typical spatial domain representations of frequency domain features for 8×8 $F_{ij}$ matrix.

FIG. 10 illustrates the description creation process for a single rectangular area by example.

FIG. 11 provides an example of Hamming distance computation.

DETAILED DESCRIPTION OF THE ILLUSTRATIVE EMBODIMENTS

The present invention provides methods and apparatus for creation of distinctive and compact data structures (descriptors), that may be used as compact representative signatures of a digital image or its specific areas. The descriptors created by the embodiments of the present invention enable to quantitively measure the similarity of a pair of interest points either in the same or in a different image.

The methods of the present invention are used as a second step in a sequence of three independent and standalone steps: interest point detection, feature description and feature matching (See FIG. 3). Therefore, the present invention requires an interest point detector to provide coordinates $(x,y)$ and scale $\sigma$ as an input (FIG. 4). The present invention is not limited to use with conjunction with any specific interest point detector, but to provide useful results during the feature matching stage (FIG. 5) it requires the detector to repeatably produce interest points that are robust to image distortions and lighting or color changes. Optionally, interest point detector may output the sign of Laplacian in the center of the detected interest point. The sign of Laplacian may be used during the matching stage to eliminate false negatives and improve matching performance, but it doesn't have any impact on the operation of the feature description stage (FIG. 5).

The coordinates (x,y) provided by an interest point detector are used to determine the center of the image area to describe. The area used to compute a descriptor is a square with its linear size proportional to σ, i.e. if we define a as the side length of the described area, a=kσ. Coefficient k may vary in reasonable measures around about 10. Extremely large values of k extend the described area to include too much of surroundings thus reducing emphasis on the interest point itself, whereas the values of k that are too small produce descriptors that are not distinctive because they only describe the local luminosity extremum in the center of an interest point. See FIG. 1

The described area is afterwards divided into smaller subareas, each to form an independent chunk of the descriptor. Such division may be performed in various ways, but for practical purposes the following division method was observed to show the best results:

1. The first subarea is the area itself.
2. 9 more subareas are formed by dividing the area into 9 squares equal in size having the edge length equal to a/3.

See FIG. 7 for clarification and FIG. 8 for examples of alternative division methods.

Each of the described subareas is divided into a uniform orthogonal grid, for illustrative embodiment assume the grid having 8×8 cells, but it can be any size depending on performance, compactness and distinctiveness requirements. Afterwards, average luminosity is calculated for each cell of the grid, thus forming a 8×8 integer matrix $L_{xy}$. Optionally we can increase performance with the use of integral images [Crow, 1984] making computation of the average luminosity a constant complexity operation with regards to cell size. Then the luminosity matrix is transformed to frequency domain by applying DFT, specifically DCT [Ahmed N. and R., 1974] was used for illustrative embodiment. As soon as DCT is quite an expensive operation in terms of performance, it's reasonable to use integer DCT instead of usual float DCT. As a result of this operation we derive a new frequency domain 8×8 matrix $F_{ij}$.

$$F_{ij} = \frac{1}{4} C_i C_j \sum_{x,y=0}^{7} L_{xy} \cos \frac{(2x+1)i\pi}{16} \cos \frac{(2y+1)j\pi}{16}$$

where $$C_i, C_j = \begin{cases} \frac{1}{\sqrt{2}} & \text{for } i, j = 0 \\ 1 & \text{otherwise} \end{cases}$$

By describing an image area in the frequency domain we get 64 numbers, each describing an independent visual peculiarity of an image, in contrary to the spacial domain, where none of the pixels anyhow describes an image or its area as a whole. For example, the $F_{00}$ coefficient corresponds to the average luminosity in the area, $F_{10}$ characterizes the gradient along the X axis, $F_{01}$ is likewise proportional to the gradient along the Y axis and $F_{22}$ corresponds to a light or a dark blob in the center of the area depending on its sign. FIG. 9 illustrates how different frequency domain features (represented by $F_{ij}$ with i and j ranging from 0 to 7) look in spatial domain, i.e. how they are represented in the image being described.

As soon as the $F_{00}$ coefficient corresponds to average luminosity, it should be discarded to make the descriptor robust to lighting changes. Afterwards, we also make the descriptor invariant to contrast changes by normalizing the rest of $F_{ij}$:

$$f_{ij} = \frac{F_{ij}}{\sum_{i+j \neq 0} |F_{ij}|}$$

To improve performance, normalization may also be limited to only integer operations:

$$f_{ij} = \frac{CF_{ij}}{\sum_{i+j \neq 0} |F_{ij}|}$$

where C is an arbitrary sufficiently large constant, e.g. $2^{16}$. After normalization, each of the $f_{ij}$ coefficients shows the significance of the feature corresponding to that coefficient in comparison to all the other features. Thus, visually predominant features will have large absolute values of their corresponding $f_{ij}$ coefficients.

It is useful to discard the high frequency part of $f_{ij}$ because high frequency features are rarely important and often correspond to image noise. This also helps keeping the descriptor as compact as possible. Thanks to visual independence of the features described by the $f_{ij}$ coefficients, each of the remaining coefficients may be stored in just 1 bit with 1-bit denoting a large absolute value of that coefficient and 0-bit denoting $f_{ij}$ being close to zero. In order to perform such classification, each of $|f_{ij}|$ should be compared to predefined threshold $T_{ij}$. Note that the threshold may not be the same for different frequencies, i.e. for higher frequencies the values of $f_{ij}$ are typically smaller than for low frequencies, so the thresholds $T_{ij}$ should be smaller as well.

The exact threshold values $T_{ij}$ vary depending on the type of images we operate with and should be fine tuned for concrete implementations. One of good ways to define $T_{ij}$ is using the statistical approach. First, a training set of images is selected depending on the application domain. Then $f_{ij}$ is computed for each interest point in each of the images from the training set. Afterwards, for each pair of i and j a median $m_{ij}$ of the list of computed $f_{ij}$ is calculated. The value of $m_{ij}$ may be either directly used as a threshold $T_{ij}$ or somehow transformed. However, any deviations from the median values in $T_{ij}$ would lead to reduction of descriptor entropy and therefore distinctiveness.

By the thresholding operation described above the memory footprint of the descriptor chunk is reduced to N bits, where N is the number of non-discarded $f_{ij}$. To improve the descriptor distinctiveness for the price of its size, significant negative and significant positive $f_{ij}$ coefficients may be stored separately, thus increasing the descriptor chunk to 2N bits. For example, for a 10-chunk descriptor (i.e. the one describing the whole feature area and its 9 subareas) this leads to a 10N-bit descriptor (20N-bit for signed variant).

For practical purposes it is sufficient to use N=8, so that the descriptor takes only 10 bytes (20 bytes for signed alternative).

Example of the descriptor chunk creation process is shown in FIG. 10.

In contrary to SIFT or SURF descriptors where the distance is defined as an Euclidean distance between the descriptor vectors, in frequency domain descriptor the distance is defined as a Hamming distance between the two bit sequences. Thus, the distance between descriptors a and b may be calculated as the Hamming weight of a^b, where ^ denotes bitwise XOR (see FIG. 11). This operation may be efficiently performed with a number of algorithms with O(log n) worst-case complexity where n is the descriptor bit string length. Moreover, most modern processors include a separate instruction for Hamming weight computation, e.g. POPCNT instruction in the SSE4.2 instruction set.

Embodiment of the present invention may be created using software, hardware or the combination thereof. Current description of the illustrative embodiment is focused on the software implementation of the present invention. However, any of the parts and methods of the present invention or the whole of it may be implemented as hardware circuit.

CONCLUSION, RAMIFICATIONS, AND SCOPE

The reader will see that, according to one embodiment of the invention, we have provided a method for computing distinctive descriptors of interest points and their surroundings that are both compact and efficient during the matching stage.

While the above description contains many specificities, these should not be seen as limitations on the scope of any embodiment, but as exemplifications of the presently preferred embodiments thereof. Many other ramifications and variations are possible within the teachings of the various embodiments. For example, the embodiment described above operates on 2D images but the present invention may be extended to 3D solid images, or spatio-temporal domains, such as video. Also the present invention was mainly described with reference to gray scale images but the present invention is not limited thereto. The present invention may also be applied to color images, however any such application implies transformation of color image or its specific areas to gray scale in one way or another.

Thus the scope of the invention should be determined by the appended claims and their legal equivalents, and not by the examples given.

REFERENCES

[Ahmed N. and R., 1974] "Discrete cosine transform" (Ahmed N., Natarajan T. and Rao K. R.).
[Bissacco, 2011] U.S. Pat. No. 8,086,616 (Bissacco, et al.).
[Crow, 1984] "Summed-area tables for texture mapping" (Crow, Franklin).
[Funayama, 2012] U.S. Pat. No. 8,165,401 (Funayama, et al.).
[Harris C., 1988] "A combined corner and edge detector" (Harris C., Stephens M.).
[Herbert Bay, 2008] "Surf: Speeded up robust features" (Herbert Bay, Andreas Ess, Tinne Tuytelaars, Luc Van Gool).
[Lin, 2010] U.S. Pat. No. 7,668,376 (Lin, et al.).
[Lowe, 2000] U.S. Pat. No. 6,711,293 (Lowe).
[Lowe, 2004] "Distinctive image features from scale-invariant keypoints" (Lowe, D. G.).
[Rosten and Drummond, 2006] "Machine learning for high-speed corner detection" (E. Rosten and T. Drummond).
[Takaki, 2011] U.S. Pat. No. 8,027,514 (Takaki, et al.).
[Troyanker, 2003] U.S. Pat. No. 6,563,959 (Troyanker).
[Wang, 2012] U.S. Pat. No. 8,233,711 (Wang, et al.).

What is claimed is:

1. A method comprising:
identifying a neighborhood around an interest point location identified within an image, the neighborhood being divided into a plurality of subregions;
for each subregion, calculating a frequency domain representation by:
applying a Fourier transform to the subregion to create the frequency domain representation of the subregion; and
normalizing the frequency domain representation of the subregion as created based on the applying of the Fourier transform to the subregion; and
combining one or more normalized frequency domain representations that correspond to respective subregions into a multidimensional descriptor for the interest point.

2. The method of claim 1, wherein the frequency domain representation of the subregion is calculated using integral images.

3. The method of claim 1, further comprising: for each subregion, weighting the frequency domain representation before or after normalization.

4. The method of claim 3, wherein the frequency domain representation is weighted using coefficient weights derived from a training set of descriptors from the same image or from different images.

5. The method of claim 4, wherein inverse medians of corresponding descriptor components from the training set are used as weighting coefficients.

6. The method of claim 1, wherein for each subregion, the frequency domain representation of the subregion is calculated as a 2-dimensional DCT of the luminosity of the subregion.

7. The method of claim 1, further comprising encoding the multidimensional descriptor to a bitwise representation.

8. The method of claim 7, wherein Hamming distance between descriptors is used as the distance measure when matching the multidimensional descriptor to another descriptor.

9. The method of claim 7, wherein the bitwise descriptor representation is formed based on one or more comparisons of components of the frequency domain representation to threshold values.

10. The method of claim 9, wherein the threshold values are calculated from a training set of descriptors.

11. A computer based system implementing the method of claim 1.

12. The method of claim 1, wherein the neighborhood around the interest point location is proportional in size to a scale of the interest point.

13. The method of claim 1, wherein combining one or more normalized frequency domain representations that correspond to respective subregions into a multidimensional descriptor for the interest point further comprises: comparing the frequency domain representation of the subregion with a predefined threshold.

14. The method of claim 1, wherein combining one or more normalized frequency domain representations that correspond to respective subregions into a multidimensional descriptor for the interest point further comprises: based on a comparison of the frequency domain representation of the subregion with a predefined threshold, discarding one or more parts of the frequency domain representation of the subregion that exceed the predefined threshold.

15. The method of claim 1, further comprising matching the multidimensional descriptor for the interest point with another descriptor of another interest point present in another image.

16. The method of claim 15, wherein matching the multidimensional descriptor for the interest point with another descriptor comprises calculating a Hamming distance between the multidimensional descriptor for the interest point and the another descriptor.

17. The method of claim 15, wherein the matching comprises bitwise matching.

18. A method comprising
identifying a neighborhood around an interest point location identified within an image, the neighborhood being divided into a plurality of subregions;
for each subregion, calculating a frequency domain representation by:
applying a Fourier transform to the subregion to create the frequency domain representation of the subregion; and
normalizing the frequency domain representation of the subregion as created based on the applying of the Fourier transform to the subregion;
discarding one or more parts of the frequency domain representation of the subregion that exceed a threshold; and
combining one or more normalized frequency domain representations that correspond to respective subregions into a multidimensional descriptor for the interest point.

19. The method of claim 18, further comprising matching the multidimensional descriptor for the interest point with another descriptor of another interest point present in another image by calculating a Hamming distance between the multidimensional descriptor for the interest point and the another descriptor.

20. A system comprising:
a processor configured to:
identify a neighborhood around an interest point location identified within an image, the neighborhood being divided into a plurality of subregions;
for each subregion, calculate a frequency domain representation via:
an application of a Fourier transform to the subregion to create the frequency domain representation of the subregion; and
a normalization of the frequency domain representation of the subregion as created based on the application of the Fourier transform to the subregion;
compare the frequency domain representation of the subregion with a threshold;
based on a comparison of the frequency domain representation of the subregion with the threshold, discard one or more p arts of the frequency domain representation of the subregion that exceed the threshold;
combine one or more normalized frequency domain representations that correspond to respective subregions into a multidimensional descriptor for the interest point; and
match the multidimensional descriptor for the interest point with another descriptor of another interest point present in another image.

* * * * *